United States Patent
Pasquier et al.

(10) Patent No.: US 7,431,741 B2
(45) Date of Patent: Oct. 7, 2008

(54) BRIGHTENING COLORANT WITH INDOLYTHIAZOLIUM DYES

(75) Inventors: Cecile Pasquier, Marly (CH); Veronique Buclin, Morlon (CH); Nadia Duc-Reichlin, Lully (CH); Caroline Kiener, Marly (CH); Hans-Juergen Braun, Ueberstorf (CH)

(73) Assignee: Wella AG, Darmstadt (DE)

( * ) Notice: Subject to any disclaimer, the term of this patent is extended or adjusted under 35 U.S.C. 154(b) by 260 days.

(21) Appl. No.: 10/588,934

(22) PCT Filed: Dec. 2, 2004

(86) PCT No.: PCT/EP2004/013706

§ 371 (c)(1),
(2), (4) Date: Aug. 9, 2006

(87) PCT Pub. No.: WO2005/080507

PCT Pub. Date: Sep. 1, 2005

(65) Prior Publication Data

US 2007/0180631 A1    Aug. 9, 2007

(30) Foreign Application Priority Data

Feb. 21, 2004   (DE) .................. 10 2004 008 606

(51) Int. Cl.
*A61Q 5/10* (2006.01)
*C07D 277/00* (2006.01)

(52) U.S. Cl. .......... 8/405; 8/406; 8/408; 8/409; 8/570; 8/571; 8/575; 548/146

(58) Field of Classification Search .......... 8/405, 8/406, 408, 409, 570, 571, 575; 548/146
See application file for complete search history.

(56) References Cited

U.S. PATENT DOCUMENTS 4,018,756 A * 4/1977 Ohkawa et al. ............. 534/607

FOREIGN PATENT DOCUMENTS

| BE | 770 437 | 12/1971 |
|----|---------|---------|
| GB | 860 584 | 2/1961 |
| GB | 1 348 665 | 3/1974 |
| GB | 1 550 306 | 8/1979 |

OTHER PUBLICATIONS

STIC Search Report dated Mar. 12, 2008.*

* cited by examiner

*Primary Examiner*—Eisa B Elhilo
(74) *Attorney, Agent, or Firm*—Michael J. Striker

(57) ABSTRACT

The present invention has for an object agents for the simultaneous brightening and dyeing of keratin fibers—particularly hair—characterized in that they contain a) at least one oxidant and (b) at least one indolylthiazoliumazo dye of formula (I) and that, (c) they have a basic pH 11 Claims, No Drawings

BRIGHTENING COLORANT WITH INDOLYTHIAZOLIUM DYES

FIELD OF THE INVENTION

The present invention has for an object agents for the simultaneous dyeing and brightening of keratin fibers, for example wool, silk or hair and particularly human hair, and which contain at least one indolylthiazoliumazo dye.

BACKGROUND OF THE INVENTION

Two coloring methods are usually used for the color-changing treatment of keratin fibers. By the first method, the coloring is accomplished with oxidative or permanent colorants by use of a mixture of different developers and couplers and of an oxidant. By this method, if necessary, it is possible to add a direct (non-oxidative) dye if the coloring result is to be adjusted or special coloring effects are to be achieved. The second method involves the exclusive use of direct dyes which in an appropriate carrier composition are applied to the fibers. This method is easy to apply, very gentle and causes only minor damage to the keratin fibers. The direct dyes used for this purpose are subject to many requirements. For example, they must be unobjectionable from a toxicological and dermatological standpoint and they must make it possible to attain colorations of a desired intensity which, among other things, presupposes sufficient water solubility. Moreover, the colorations obtained must exhibit good light stability, acid resistance and abrasion resistance.

Compared to oxidative colorations, however, non-oxidative ones as a rule are less durable and exhibit a less adequate color balance. In addition, direct dyes usually are not capable of "imparting to the hair a brighter shade", because many direct dyes do not tolerate the oxidants needed for brightening and/or the required pH which is higher than or equal to 9.

SUMMARY OF THE INVENTION

The goal of the present invention therefore is to provide a colorant, particularly for the orange to violet color range that is based on direct dyes and is resistant to basic pH conditions and to oxidants.

We have now found that this goal can be reached by use of certain indolylthiazoliumazo dyes.

DETAILED DESCRIPTION OF THE INVENTION

The present invention therefore has for an object an agent for the simultaneous brightening and dyeing of keratin fibers—particularly hair—characterized in that it contains (a) an oxidant and (b) at least one indolylthiazoliumazo dye of formula (I) and that (c) it has a basic pH

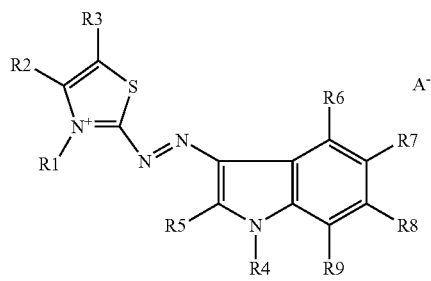

(I)

wherein
R1 stands for a saturated or unsaturated $(C_1-C_{12})$-alkyl group, a halogen atom (F, Cl, Br, I)-substituted $(C_1-C_{12})$-alkyl group, a hydroxy-$(C_1-C_{12})$-alkyl group, a $(C_1-C_6)$-alkoxy-$(C_1-C_{12})$-alkyl group, an amino-$(C_1-C_{12})$-alkyl group, a $(C_1-C_6)$-alkylamino-$(C_1-C_{12})$-alkyl group, a di$(C_1-C_6)$-alkylamino-$(C_1-C_{12})$-alkyl group, a cyano-$(C_1-C_{12})$-alkyl group, a substituted or unsubstituted phenyl group or a substituted or unsubstituted benzyl group;
R2 and R3 can be equal or different and independently of each other stand for hydrogen, a halogen atom (F, Cl, Br, I), a saturated or unsaturated $(C_1-C_{12})$-alkyl group, a $(C_1-C_{12})$-alkoxy group, a nitro group, an amino group, a $(C_1-C_{12})$-alkylamino group, a di$(C_1-C_{12})$-alkylamino group, a $(C_1-C_{12})$-hydroxyalkylamino group, a di$(C_1-C_{12})$-hydroxyalkylamino group, a substituted or unsubstituted phenyl group or a substituted or unsubstituted heteroaryl group;
R4 stands for a saturated or unsaturated $(C_1-C_{12})$-alkyl group, a halogen atom (F, Cl, Br, I)-substituted $(C_1-C_{12})$-alkyl group, a hydroxy-$(C_1-C_{12})$-group, a $(C_1-C_6)$-alkoxy-$(C_1-C_{12})$-alkyl group, an amino-$(C_1-C_{12})$-alkyl group, a $(C_1-C_6)$-alkylamino-$(C_1-C_{12})$-alkyl group, a di-$(C_1-C_6)$-alkylamino-$(C_1-C_{12})$-alkyl group, a cyano-$(C_1-C_{12})$-alkyl group, a substituted or unsubstituted phenyl group, a substituted or unsubstituted benzyl group or a substituted or unsubstituted heteroaryl group;
R5 stands for hydrogen, a saturated $(C_1-C_{12})$-alkyl group, a substituted or unsubstituted phenyl group or a C(O)O—$(C_1-C_{12})$-alkyl group;
R6, R7, R8 and R9 can be equal or different and independently of each other stand for hydrogen, a halogen atom (F, Cl, Br, I), a saturated or unsaturated $(C_1-C_{12})$-alkyl group, a hydroxyl group, a $(C_1-C_{12})$-alkoxy group, a nitro group, an amino group, a $(C_1-C_{12})$-alkylamino group or a di$(C_1-C_{12})$-alkylamino group; and
$A^-$ stands for an anion of an organic or inorganic acid.

Preferred among the afore-said compounds of formula (I) are those wherein R1 stands for a saturated or unsaturated $(C_1-C_{12})$-alkyl group and R4 stands for a saturated or unsaturated $(C_1-C_{12})$-alkyl group or a substituted or unsubstituted phenyl group. Particularly preferred are compounds of formula (I) wherein R1 is a saturated $(C_1-C_{12})$-alkyl group and R4 is a saturated $(C_1-C_{12})$-alkyl group or an unsubstituted phenyl group;
$A^-$ is preferably a chloride, bromide, iodide, hydrogen sulfate, sulfate, toluenesulfonate, benzenesulfonate, monomethylsulfate, hexafluorophosphate, hexafluoroantimonate, tetrafluoroborate, tetraphenylborate, formate, acetate or propionate, the chloride ion, bromide ion and monomethylsulfate ion being particularly preferred.

Suitable compounds of general formula (I) are, for example: 3-methyl-2-[(1-methyl-2-phenyl-1H-indol-3-yl)azo]thiazolium chloride, 3-methyl-2-[(1-methyl-2-phenyl-1H-indol-3-yl)azo]thiazolium bromide, 3-methyl-2-[(1-methyl-2-phenyl-1H-indol-3-yl)azo]thiazolium monomethylsulfate, 3,4-dimethyl-2-[(1-methyl-2-phenyl-1H-indol-3-yl)azo]thiazolium chloride, 3,4-dimethyl-2-[(1-methyl-2-phenyl-1H-indol-3-yl)azo]thiazolium bromide, 3,4-dimethyl-2-[(1-methyl-2-phenyl-1H-indol-3-yl)azo]thiazolium monomethylsulfate, 3,5-dimethyl-2-[(1-methyl-2-phenyl-1H-indol-3-yl)azo]thiazolium chloride, 3,5-dimethyl-2-[(1-methyl-2-phenyl-1H-indol-3-yl)azo]thiazolium bromide, 3,5-dimethyl-2-[(1-methyl-2-phenyl-1H-indol-3-yl)azo]thiazolium monomethylsulfate, 3,4,5-trimethyl-2-[(1-methyl-2-phenyl-1H-indol-3-yl)azo]thiazolium chloride, 3,4,5-trimethyl-2-[(1-methyl-2-phenyl-1H-indol-3-yl)azo]thiazolium bromide, 3,4,5-trimethyl-2-[(1-methyl-2- phenyl-1H-indol-3-yl)azo]thiazolium monomethylsulfate, 5-bromo-3-methyl-2-[(1-methyl-2-phenyl-1H-indol-3-yl)azo]thiazolium chloride, 5-bromo-3-methyl-2-[(1-methyl-2-phenyl-1H-indol-3-yl)azo]thiazolium bromide, 5-bromo-3-methyl-2-[(1-methyl-2-phenyl-1H-indol-3-yl)azo]thiazolium monomethylsulfate, 5-methoxy-3-methyl-2-[(1-methyl-2-phenyl-1H-indol-3-yl)azo]thiazolium chloride, 5-methoxy-3-methyl-2-[(1-methyl-2-phenyl-1H-indol-3-yl)azo]thiazolium bromide, 5-methoxy-3-methyl-2-[(1-methyl-2-phenyl-1H-indol-3-yl)azo]thiazolium monomethylsulfate, 5-diethylamino-3-methyl-2-[(1-methyl-2-phenyl-1H-indol-3-yl)azo]thiazolium chloride, 5-diethylamino-3-methyl-2-[(1-methyl-2-phenyl-1H-indol-3-yl)azo]thiazolium bromide, 5-diethylamino-3-methyl-2-[(1-methyl-2-phenyl-1H-indol-3-yl)azo]thiazolium monomethylsulfate, 3-methyl-2-[(1-methyl-2-phenyl-1H-indol-3-yl)azo]-5-nitrothiazolium chloride, 3-methyl-2-[(1-methyl-2-phenyl-1H-indol-3-yl)azo]-5-nitrothiazolium bromide, 3-methyl-2-[(1-methyl-2-phenyl-1H-indol-3-yl)azo]-5-nitrothiazolium monomethylsulfate, 3-methyl-2-[(1,2-dimethyl-1H-indol-3-yl)azo]thiazolium chloride, 3-methyl-2-[(1,2-dimethyl-1H-indol-3-yl)-azo]thiazolium bromide, 3-methyl-2-[(1,2-dimethyl-1H-indol-3-yl)azo]thiazolium monomethylsulfate, 3,4-dimethyl-2-[(1,2-dimethyl-1H-indol-3-yl)azo]thiazolium chloride, 3,4-dimethyl-2-[(1,2-dimethyl-1H-indol-3-yl)azo]thiazolium bromide, 3,4-dimethyl-2-[(1,2-dimethyl-1H-indol-3-yl)azo]thiazolium monomethylsulfate, 3,5-dimethyl-2-[(1,2-dimethyl-1H-indol-3-yl)azo]thiazolium chloride, 3,5-dimethyl-2-[(1,2-dimethyl-2-phenyl-1H-indol-3-yl)azo]thiazolium bromide, 3,5-dimethyl-2-[(1,2-dimethyl-1H-indol-3-yl)azo]thiazolium monomethylsulfate, 3,4,5-trimethyl-2-[(1,2-dimethyl-1H-indol-3-yl)azo]thiazolium chloride, 3,4,5-trimethyl-2-[(1,2-dimethyl-1H-indol-3-yl)azo]thiazolium bromide, 3,4,5-trimethyl-2-[(1,2-dimethyl-1H-indol-3-yl)azo]thiazolium monomethylsulfate, 5-bromo-3-methyl-2-[(1,2-dimethyl-1H-indol-3-yl)azo]thiazolium chloride, 5-bromo-3-methyl-2-[(1,2-dimethyl-1H-indol-3-yl)-azo]thiazolium bromide, 5-bromo-3-methyl-2-[(1,2-dimethyl-1H-indol-3-yl)azo]thiazolium monomethylsulfate, 5-methoxy-3-methyl-2-[(1,2-dimethyl-1H-indol-3-yl)azo]thiazolium chloride, 5-methoxy-3-methyl-2-[(1,2-dimethyl-1H-indol-3-yl)azo]thiazolium bromide, 5-methoxy-3-methyl-2-[(1,2-dimethyl-1H-indol-3-yl)azo]thiazolium monomethylsulfate, 5-diethylamino-3-methyl-2-[(1,2-dimethyl-1H-indol-3-yl)azo]thiazolium chloride, 5-diethylamino-3-methyl-2-[(1,2-dimethyl-1 H-indol-3-yl)azo]thiazolium bromide, 5-diethylamino-3-methyl-2-[(1,2-dimethyl-1H-indol-3-yl)azo]thiazolium monomethylsulfate, 3-methyl-2-[(1,2-dimethyl-1H-indol-3-yl)azo]-5-nitrothiazolium chloride, 3-methyl-2-[(1,2-dimethyl-1H-indol-3-yl)azo]-5-nitrothiazolium bromide, 3-methyl-2-[(1,2-dimethyl-1H-indol-3-yl)azo]-5-nitrothiazolium monomethylsulfate, 2-[(1-ethyl-2-phenyl-1H-indol-3-yl)azo]-3-methylthiazolium chloride, 2-[(1-ethyl-2-phenyl-1H-indol-3-yl)azo]-3-methylthiazolium bromide, 2-[(1-ethyl-2-phenyl-1H-indol-3-yl)azo]-3-methylthiazolium monomethylsulfate, 2-[(1-ethyl-2-phenyl-1H-indol-3-yl)azo]-3,4-dimethylthiazolium chloride, 2-[(1-ethyl-2-phenyl-1H-indol-3-yl)azo]-3,4-dimethylthiazolium bromide, 2-[(1-ethyl-2-phenyl-1H-indol-3-yl)azo]-3,4-dimethylthiazolium monomethylsulfate, 2-[(1-ethyl-2-phenyl-1H-indol-3-yl)azo]-3,5-dimethylthiazolium chloride, 2-[(1-ethyl-2-phenyl-1H-indol-3-yl)azo]-3,5-dimethylthiazolium bromide, 2-[(1-ethyl-2-phenyl-1H-indol-3-yl)azo]-3,5-dimethylthiazolium monomethylsulfate, 2-[(1-ethyl-2-phenyl-1H-indol-3-yl)azo]-3,4,5-trimethylthiazolium chloride, 2-[(1-ethyl-2-phenyl-1H-indol-3-yl)-azo]-3,4,5-trimethylthiazolium bromide, 2-[(1-ethyl-2-phenyl-1H-indol-3-yl)azo]-3,4,5-trimethylthiazolium monomethylsulfate, 5-bromo-2-[(1-ethyl-2-phenyl-1H-indol-3-yl)azo]-3-methylthiazolium chloride, 5-bromo-2-[(1-ethyl-2-phenyl-1H-indol-3-yl)azo]-3-methylthiazolium bromide, 5-bromo-2-[(1-ethyl-2-phenyl-1H-indol-3-yl)azo]-3-methylthiazolium monomethylsulfate, 2-[(1-ethyl-2-phenyl-1H-indol-3-yl)azo]-5-methoxy-3-methylthiazolium chloride, 2-[(1-ethyl-2-phenyl-1H-indol-3-yl)azo]-5-methoxy-3-methylthiazolium bromide, 2-[(1-ethyl-2-phenyl-1H-indol-3-yl)azo]-5-methoxy-3-methylthiazolium monomethylsulfate, 5-diethylamino-2-[(1-ethyl-2-phenyl-1H-indol-3-yl)azo]-3-methylthiazolium chloride, 5-diethylamino-2-[(1-ethyl-2-phenyl-1H-indol-3-yl)azo]-3-methylthiazolium bromide, 5-diethylamino-2-[(1-ethyl-2-phenyl-1H-indol-3-yl)azo]-3-methylthiazolium monomethylsulfate, 2-[(1-ethyl-2-phenyl-1H-indol-3-yl)azo]-3-methyl-5-nitrothiazolium chloride, 2-[(1-ethyl-2-phenyl-1H-indol-3-yl)azo]-3-methyl-5-nitrothiazolium bromide, 2-[(1-ethyl-2-phenyl-1H-indol-3-yl)-azo]-3-methyl-5-nitrothiazolium monomethylsulfate, 3-methyl-2-[(1,2-diphenyl-1H-indol-3-yl)azo]thiazolium chloride, 3-methyl-2-[(1,2-diphenyl-1H-indol-3-yl)azo]thiazolium bromide, 3-methyl-2-[(1,2-diphenyl-1H-indol-3-yl)azo]thiazolium monomethylsulfate, 3,4-dimethyl-2-[(1,2-diphenyl-1H-indol-3-yl)azo]thiazolium chloride, 3,4-dimethyl-2-[(1,2-diphenyl-1H-indol-3-yl)azo]thiazolium bromide, 3,4-dimethyl-2-[(1,2-diphenyl-1H-indol-3-yl)azo]thiazolium monomethylsulfate, 3,5-dimethyl-2-[(1,2-diphenyl-1 H-indol-3-yl)azo]thiazolium chloride, 3,5-dimethyl-2-[(1,2-diphenyl-1H-indol-3-yl)azo]thiazolium bromide, 3,5-dimethyl-2-[(1,2-diphenyl-1H-indol-3-yl)azo]thiazolium monomethylsulfate, 3,4,5-trimethyl-2-[(1,2-diphenyl-1H-indol-3-yl)azo]thiazolium chloride, 3,4,5-trimethyl-2-[(1,2-diphenyl-1H-indol-3-yl)azo]thiazolium bromide, 3,4,5-trimethyl-2-[(1,2-diphenyl-1H-indol-3-yl)azo]thiazolium monomethylsulfate, 5-bromo-3-methyl-2-[(1,2-diphenyl-1H-indol-3-yl)azo]thiazolium chloride, 5-bromo-3-methyl-2-[(1,2-diphenyl-1H-indol-3-yl)azo]thiazolium bromide, 5-bromo-3-methyl-2-[(1,2-diphenyl-1H-indol-3-yl)azo]thiazolium monomethylsulfate, 5-methoxy-3-methyl-2-[(1,2-diphenyl-1H-indol-3-yl)azo]thiazolium chloride, 5-methoxy-3-methyl-2-[(1,2-diphenyl-1H-indol-3-yl)azo]thiazolium bromide, 5-methoxy-3-methyl-2-[(1,2-diphenyl-1H-indol-3-yl)azo]thiazolium monomethylsulfate, 5-diethylamino-3-methyl-2-[(1,2-diphenyl-1H-indol-3-yl)azo]thiazolium chloride, 5-diethylamino-3-methyl-2-[(1,2-diphenyl-1H-indol-3-yl)azo]thiazolium bromide, 5-diethylamino-3-methyl-2-[(1,2-diphenyl-1H-indol-3-yl)azo]-thiazolium monomethylsulfate, 3-methyl-5-nitro-2-[(1,2-diphenyl-1H-indol-3-yl)azo]thiazolium chloride, 3-methyl-5-nitro-2-[(1,2-diphenyl-1H-indol-3-yl)azo]thiazolium bromide, 3-methyl-5-nitro-2-[(1,2-diphenyl-1H-indol-3-yl)azo]thiazolium monomethylsulfate, 3-ethyl-2-[(1-ethyl-2-phenyl-1H-indol-3-yl)azo]-thiazolium chloride, 3-ethyl-2-[(1-ethyl-2-phenyl-1H-indol-3-yl)azo]thiazolium bromide, 3-ethyl-2-[(1-ethyl-2-phenyl-1H-indol-3-yl)azo]thiazolium monomethylsulfate, 3-ethyl-2-[(1-ethyl-2-phenyl-1H-indol-3-yl)azo]4-methylthiazolium chloride, 3-ethyl-2-[(1-ethyl-2-phenyl-1H-indol-3-yl)azo]4-methylthiazolium bromide, 3-ethyl-2-[(1-ethyl-2-phenyl-1H-indol-3-yl)azo]4-methylthiazolium monomethylsulfate, 3-ethyl-2-[(1-ethyl-2-phenyl-1H-indol-3-yl)azo]-5-methylthiazolium chloride, 3-ethyl-2-[(1-ethyl-2-phenyl-1H-indol-3-yl)azo]-5-methylthiazolium bromide, 3-ethyl-2-[(1-ethyl-2-phenyl-1H-indol-3-yl)azo]-5-methylthiazolium monomethylsulfate, 3-ethyl-2-[(1-ethyl-2-phenyl-1H-indol-3-yl)azo]4,5-dimethylthiazolium chloride, 3-ethyl-2-[(1-ethyl-2-phenyl-1H-indol-3-yl)-azo]4,5-dimethylthiazolium bromide, 3-ethyl-2-[(1-ethyl-2-phenyl-1H-indol-3-yl)azo]4,5-dimethylthiazolium monomethylsulfate, 5-bromo-3-ethyl-2-[(1-ethyl-2-phenyl-1H-indol-3-yl)azo]thiazolium chloride, 5-bromo-3-ethyl-2-[(1-ethyl-2-phenyl-1H-indol-3-yl)azo] thiazolium bromide, 5-bromo-3-ethyl-2-[(1-ethyl-2-phenyl-1H-indol-3-yl)azo]thiazolium monomethylsulfate, 3-ethyl-2-[(1-ethyl-2-phenyl-1H-indol-3-yl)azo]-5-methoxythiazolium chloride, 3-ethyl-2-[(1-ethyl-2-phenyl-1H-indol-3-yl)azo]-5-methoxythiazolium bromide, 3-ethyl-2-[(1-ethyl-2-phenyl-1H-indol-3-yl)azo]-5-methoxythiazolium monomethylsulfate, 3-ethyl-5-diethylamino-2-[(1-ethyl-2-phenyl-1H-indol-3-yl)azo] thiazolium chloride, 3-ethyl-5-diethylamino-2-[(1-ethyl-2-phenyl-1H-indol-3-yl)azo]thiazolium bromide, 3-ethyl-5-diethylamino-2-[(1-ethyl-2-phenyl-1H-indol-3-yl)azo] thiazolium monomethylsulfate, 3-ethyl-2-[(1-methyl-2-phenyl-1H-indol-3-yl)azo]thiazolium chloride, 3-ethyl-2-[(1-methyl-2-phenyl-1H-indol-3-yl)azo]thiazolium bromide, 3-ethyl-2-[(1-methyl-2-phenyl-1H-indol-3-yl)azo] thiazolium monomethylsulfate, 2-[(1-methyl-2-phenyl-1H-indol-3-yl)azo]-3-propylthiazolium chloride, 2-[(1-methyl-2-phenyl-1H-indol-3-yl)azo]-3-propylthiazolium bromide, 2-[(1-methyl-2-phenyl-1H-indol-3-yl)azo]-3-propylthiazolium monomethylsulfate, 3-hydroxyethyl-2-[(1-methyl-2-phenyl-1H-indol-3-yl)azo]thiazolium chloride, 3-hydroxyethyl-2-[(1-methyl-2-phenyl-1H-indol-3-yl)azo]thiazolium bromide, 3-hydroxyethyl-2-[(1-methyl-2-phenyl-1H-indol-3-yl)-azo]thiazolium monomethylsulfate, 2-[(1-methyl-2-phenyl-1H-indol-3-yl)azo]-3-(2-propenyl)thiazolium chloride, 2-[(1-methyl-2-phenyl-1H-indol-3-yl)azo]-3-(2-propenyl)thiazolium bromide and 2-[(1-methyl-2-phenyl-1H-indol-3-yl)azo]-3-(2-propenyl)thiazolium monomethylsulfate.

Particularly preferred compounds of formula (I) are:
3-methyl-2-[(1-methyl-2-phenyl-1H-indol-3-yl)azo]thiazolium chloride, 3-methyl-2-[(1-methyl-2-phenyl-1H-indol-3-yl)azo]thiazolium bromide, 3-methyl-2-[(1-methyl-2-phenyl-1H-indol-3-yl)azo]thiazolium monomethylsulfate, 3,4-dimethyl-2-[(1-methyl-2-phenyl-1H-indol-3-yl)azo]thiazolium chloride, 3,4-dimethyl-2-[(1-methyl-2-phenyl-1H-indol-3-yl)azo]thiazolium bromide, 3,4-dimethyl-2-[(1-methyl-2-phenyl-1H-indol-3-yl)azo]thiazolium monomethylsulfate, 3,5-dimethyl-2-[(1-methyl-2-phenyl-1H-indol-3-yl)azo]thiazolium chloride, 3,5-dimethyl-2-[(1-methyl-2-phenyl-1H-indol-3-yl)azo]thiazolium bromide, 3,5-dimethyl-2-[(1-methyl-2-phenyl-1H-indol-3-yl)azo]thiazolium monomethylsulfate, 3,4,5-trimethyl-2-[(1-methyl-2-phenyl-1H-indol-3-yl)azo]thiazolium chloride, 3,4,5-trimethyl-2-[(1-methyl-2-phenyl-1H-indol-3-yl)azo]thiazolium bromide, 3,4,5-trimethyl-2-[(1-methyl-2-phenyl-1H-indol-3-yl)-azo] thiazolium monomethylsulfate, 5-bromo-3-methyl-2-[(1-methyl-2-phenyl-1H-indol-3-yl)azo]thiazolium chloride, 5-bromo-3-methyl-2-[(1-methyl-2-phenyl-1H-indol-3-yl)azo]-thiazolium bromide, 5-bromo-3-methyl-2-[(1-methyl-2-phenyl-1H-indol-3-yl)azo]thiazolium monomethylsulfate, 5-methoxy-3-methyl-2-[(1-methyl-2-phenyl-1H-indol-3-yl)azo]thiazolium chloride, 5-methoxy-3-methyl-2-[(1-methyl-2-phenyl-1H-indol-3-yl)azo] thiazolium bromide, 5-methoxy-3-methyl-2-[(1-methyl-2-phenyl-1H-indol-3-yl)azo]thiazolium monomethylsulfate, 3-methyl-2-[(1,2-dimethyl-1H-indol-3-yl)azo]thiazolium chloride, 3-methyl-2-[(1,2-dimethyl-1H-indol-3-yl)azo]thiazolium bromide, 3-methyl-2-[(1,2-dimethyl-1H-indol-3-yl)azo]thiazolium monomethylsulfate, 3,4-dimethyl-2-[(1,2-dimethyl-1H-indol-3-yl)azo]thiazolium chloride, 3,4-dimethyl-2-[(1,2-dimethyl-1H-indol-3-yl)azo]thiazolium bromide, 3,4-dimethyl-2-[(1,2-dimethyl-1H-indol-3-yl)azo]thiazolium monomethylsulfate, 3,5-dimethyl-2-[(1,2-dimethyl-1H-indol-3-yl)azo]thiazolium chloride, 3,5-dimethyl-2-[(1,2-dimethyl-1H-indol-3-yl)azo]thiazolium bromide, 3,5-dimethyl-2-[(1,2-dimethyl-1H-indol-3-yl)azo]thiazolium monomethylsulfate, 3,4,5-trimethyl-2-[(1,2-dimethyl-1H-indol-3-yl)azo]thiazolium chloride, 3,4,5-trimethyl-2-[(1,2-dimethyl-1H-indol-3-yl)azo]thiazolium bromide, 3,4,5-trimethyl-2-[(1,2-dimethyl-1H-indol-3-yl)azo]thiazolium monomethylsulfate, 5-bromo-3-methyl-2-[(1,2-dimethyl-1H-indol-3-yl)azo]thiazolium chloride, 5-bromo-3-methyl-2-[(1,2-dimethyl-1H-indol-3-yl)azo]thiazolium bromide, 5-bromo-3-methyl-2-[(1,2-dimethyl-1H-indol-3-yl)-azo]thiazolium monomethylsulfate, 5-methoxy-3-methyl-2-[(1,2-dimethyl-1H-indol-3-yl)-azo]thiazolium chloride, 5-methoxy-3-methyl-2-[(1,2-dimethyl-1H-indol-3-yl)azo]thiazolium bromide, 5-methoxy-3-methyl-2-[(1,2-dimethyl-1H-indol-3-yl)azo]thiazolium monomethylsulfate, 3-methyl-2-[(1,2-dimethyl-1H-indol-3-yl)azo]-5-nitrothiazolium chloride, 3-methyl-2-[(1,2-dimethyl-1H-indol-3-yl)azo]-5-nitrothiazolium bromide, 3-methyl-2-[(1,2-dimethyl-1H-indol-3-yl)azo]-5-nitrothiazolium monomethylsulfate, 3-methyl-2-[(1,2-diphenyl-1 H-indol-3-yl)azo]thiazolium chloride, 3-methyl-2-[(1,2-diphenyl-1H-indol-3-yl)azo]thiazolium bromide, 3-methyl-2-[(1,2-diphenyl-1H-indol-3-yl)azo]thiazolium monomethylsulfate, 3,4-dimethyl-2-[(1,2-diphenyl-1H-indol-3-yl)azo]thiazolium chloride, 3,4-dimethyl-2-[(1,2-diphenyl-1H-indol-3-yl)azo]thiazolium bromide, 3,4-dimethyl-2-[(1,2-diphenyl-1H-indol-3-yl)-azo]thiazolium monomethylsulfate, 3,5-dimethyl-2-[(1,2-diphenyl-1H-indol-3-yl)azo]thiazolium chloride, 3,5-dimethyl-2-[(1,2-diphenyl-1H-indol-3-yl)azo]thiazolium bromide, 3,5-dimethyl-2-[(1,2-diphenyl-1H-indol-3-yl)azo]thiazolium monomethylsulfate, 3,4,5-trimethyl-2-[(1,2-diphenyl-1H-indol-3-yl)azo]thiazolium chloride, 3,4,5-trimethyl-2-[(1,2-diphenyl-1H-indol-3-yl)azo]thiazolium bromide, 3,4,5-trimethyl-2-[(1,2-diphenyl-1H-indol-3-yl)azo]thiazolium monomethylsulfate, 5-bromo-3-methyl-2-[(1,2-diphenyl-1H-indol-3-yl)azo]thiazolium chloride, 5-bromo-3-methyl-2-[(1,2-diphenyl-1H-indol-3-yl)azo]thiazolium bromide, 5-bromo-3-methyl-2-[(1,2-diphenyl-1H-indol-3-yl) azo]thiazolium monomethylsulfate, 5-methoxy-3-methyl-2-[(1,2-diphenyl-1H-indol-3-yl)azo]thiazolium chloride, 5-methoxy-3-methyl-2-[(1,2-diphenyl-1H-indol-3-yl) azo]thiazolium bromide and 5-methoxy-3-methyl-2-[(1,2-diphenyl-1H-indol-3-yl)azo]thiazolium monomethylsulfate.

The colorant of the invention contains the compounds of formula (I) preferably in an amount from 0.01 to 10 weight percent and particularly from 0.1 to 8 weight percent.

Besides the dyes of formula (I), the colorant of the invention can additionally contain other known, direct, oxidant-resistant dyes, for example 3-(2',6'-diaminopyridyl-3'-azo) pyridine (=2,6-diamino-3-[(pyridin-3-yl)azo]pyridine), N,N-di(2-hydroxyethyl)-3-methyl4-[(4-nitrophenyl)azo]aniline (Disperse Red 17; C.I. 11210), 3-diethylamino-7-(4-dimethylaminophenylazo)-5-phenylphenazinium chloride (C.I. 11050), 4-(2-thiazolylazo)resorcinol, 4-[(4-phenylamino)azo]benzenesulfonic acid sodium salt (Orange IV), 1-[(3-aminopropyl)amino]-9,10-anthracenedione (HC Red No. 8), 3',3",4,5,5',5",6,7-octabromophenolsulfonphthalein (Tetrabromophenol Blue), 1-[(4-amino-3,5-dimethylphenyl)-(2,6-dichlorophenyl)methylene]-3,5-dimethyl4-imino-2,5-cyclohexadiene-phosphoric acid (1:1) (Basic Blue 77), 3',3'',5',5''-tetrabromo-m-cresolsulfonphthalein, 2,4-dinitro-1-naphthol-7-sulfonic acid disodium salt (Acid Yellow 1; C.I. 10316), 4-[2'-hydroxy-1'-naphthyl)azo]benzenesulfonic acid sodium salt (Acid Orange 7; C.I. 15510), 3',6'-dihydroxy-2',4',5',7'-tetraiodospiro[isobenzofuran-1(3H),9'(9H)xanthen]-3-one disodium salt (Acid Red 51; C.I. 45430), 6-hydroxy-5-[(2-methoxy-5-methyl-4-sulfophenyl)azo]-2-naphthalenesulfonic acid disodium salt (FD&C Red 40; C.I. 16035), 2,4-dinitro-1-naphthol sodium salt (Acid Yellow 24; C.I. 10315), 2',4',5',7'-tetrabromo-4,5,6,7-tetrachloro-3',6'-dihydroxyspiro{isobenzofuran-1(3H),9'[9H]xanthen}-3-one disodium salt (Acid Red 92; C.I. 45410), 4-(2-hydroxy-1-naphthylazo)-3-methylbenzenesulfonic acid sodium salt (Acid Orange 8; C.I. 15575), 2-amino-1,4-naphthalenedione, dithizone (1,5-diphenylthiocarbazone), N-(2-hydroxyethyl)-2-nitro4-trifluoromethyl)aniline (HC Yellow 13), N-(2-hydroxyethyl)4-nitroaniline, 4-chloro-N-(2,3-dihydroxypropyl)-2-nitroaniline, 1-methyl4-[(methylphenyl-hydrazono)methyl]pyridinium methylsulfate (Basic Yellow No. 87), 3-[(4,5-dihydro-3-methyl-5-keto-1-phenyl-1H-pyrazol-4yl)azo]-N,N,N-trimethylbenzenaminium chloride, 3-[(3-methyl-5-hydroxy-1-phenyl-1H-pyrazol4-yl)azo]trimethylammoniobenzene chloride (Basic Yellow No. 57), 2-[(4-aminophenyl)azo]-1,3-dimethyl-1H-imidazol-3-ium chloride (Basic Orange No. 31), 1,4-dimethyl-5-{[4-(dimethylamino)phenyl]azo}-1,2,4-triazolium chloride (Basic Red No. 22); C.I. 11055), 2-{[4-dimethylamino)phenyl]azo}-1,3-dimethyl-1H-imidazolium chloride (Basic Red No. 51), 1,4-dimethyl-5-{[[4-[methyl(phenylmethyl)amino]phenyl]azo}-1,2,4-triazolium bromide (Basic Red No. 46), N,N,N-trimethyl-3-{[4-(methylamino)-9,10-diketo-9,10-dihydro-1-anthracenyl]amino}-1-propanaminium methylsulfate, N,N-dimethyl-3{[4-(methylamino)-9,10-diketo-9,10-dihydro-1-anthracenyl]amino}-1-propanaminium chloride and N,N-dimethyl-3-{[4-(methylamino)-9,10-diketo-9,10-dihydro-1-anthracenyl]amino}-N-propyl-1-propanaminium bromide.

The colorant of the invention contains the dyes of formula (I) and the direct dyes in a total amount of about 0.01 to 15 weight percent and particularly about 0.1 to 12 weight percent.

Naturally, it is also possible to add to the colorant of the invention oxidation precursors (developers and couplers), for example o,p,m-phenylenediamines, o,p,m-aminophenols, diphenols or 4,5-diaminopyrazoles. The colorant can contain these additional developers and couplers in a total amount from about 0.01 to 20 wt.%, preferably from about 0.1 to 10 wt. % and particularly from 0.1 to 5 wt. %, each.

The colorant of the invention can be in the form of, for example, a solution, particularly an aqueous or aqueous-alcoholic solution, or a cream, a gel, a surfactant-containing foaming solution (shampoo, aerosol), an emulsion or a water-containing carrier suitable for use on hair. The colorant of the invention can also be in the form of pellets, granulate or powder which before use is dissolved in an aqueous preparation, for example water or an aqueous oxidant preparation. The composition of these agents consists of a mixture of the dye component and the additives usually employed for such preparations.

Common additives to solutions, creams, emulsions or gels are, for example, solvents such as water, the lower aliphatic monohydric or polyhydric alcohols, the esters and ethers thereof, for example alkanols, particularly those with 1 to 4 carbon atoms, for example ethanol, propanol, isopropanol, butanol, isobutanol, dihydric and trihydric alcohols, particularly those with 2 to 6 carbon atoms, for example ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, polyalkylene glycols such as triethylene glycol, polyethylene glycol, tripropylene glycol, polypropylene glycol, the lower alkyl ethers of polyhydric alcohols such as ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, triethylene glycol monomethyl ether and triethylene glycol monoethyl ether, ketones and ketoalcohols, particularly those with 3 to 7 carbon atoms, for example acetone, methyl ethyl ketone, diethyl ketone, methyl isobutyl ketone, methyl phenyl ketone, cyclopentanone, cyclohexanone and diacetone alcohol, furthermore ethers, for example dibutyl ether, tetrahydrofuran, dioxane, diisopropyl ether, esters, for example ethyl formate, methyl formate, methyl acetate, ethyl acetate, propyl acetate, butyl acetate, phenyl acetate, ethylene glycol monoethyl ether acetate and hydroxyethyl acetate, amides, for example dimethylformamide and dimethylacetamide, N-methylpyrrolidone as well as urea, tetramethylurea and thiodiglycol.

Moreover, the colorant of the invention can contain wetting agents or emulsifiers from the classes of anionic, cationic, amphoteric, nonionic or zwitterionic surface-active substances, for example fatty alcohol sulfates, ethoxylated fatty alcohol sulfates, alkylsulfonates, alkylbenzenesulfonates, α-olefinsulfonates, alkyltrimethylammonium salts, alkylbetaines, ethoxylated fatty alcohols, ethoxylated nonylphenols, fatty alkanolamides, ethoxylated fatty esters, fatty alcohol polyglycol ether sulfates, alkylpolyglucosides, thickeners such as the higher fatty alcohols, starch, cellulose derivatives, vaselines, paraffin oil, fatty acids and other fat constituents in emulsified form, water-soluble polymeric thickeners such as the natural gums, guar gum, xanthan gum, carob bean flour, pectin, dextran, agar, amylose, amylopectin, dextrins, clays or fully synthetic hydrocolloids, for example polyvinyl alcohol, as well as hair-care agents such as lanolin derivatives, cholesterol, pantothenic acid, water-soluble cationic polymers, protein derivatives, provitamins, vitamins, plant extracts, sugar and betaine, auxiliary agents such as moisturizers, electrolytes, antioxidants, fatty amides, sequestering agents, film-forming agents and preservatives. In addition to water, a water-soluble organic solvent or a mixture of such solvents or else a water/solvent mixture can be used.

The said constituents are used in amounts normally employed for such purposes, for example the wetting agents and emulsifiers at a concentration from about 0.1 to 30 wt. %, the thickeners in an amount from about 0.1 to 30 wt. % and the hair-care agents at a concentration from about 0.1 to 5 wt. %.

The ready-to-use colorant of the invention is prepared just before use by mixing the dyes-containing dye carrier composition with an oxidant.

Suitable oxidants are mainly hydrogen peroxide and the compounds of addition thereof to urea, melamine, sodium borate or sodium carbonate in the form of a 1% to 12% and preferably 3% to 9% aqueous solution. The weight ratio of dye carrier composition to oxidant is preferably about 5:1 to 1:3 and particularly 1:1 to 1:2. Larger amounts of oxidant are used primarily with higher concentrations of oxidative dye precursors in the colorant or when it is desired to achieve more pronounced bleaching of the keratin fibers (particularly hair) at the same time. In the case that a brightening of the keratin fibers of up to 6 shade degrees is intended, it is possible to add a persulfate, for example ammonium persulfate, potassium persulfate or sodium persulfate or a mixture thereof, provided that the dyes of formula (I) are resistant to persulfates.

After the dye carrier composition and the oxidant have been mixed, the pH of the ready-to-use colorant assumes a value which depends on the pH of the dye carrier composition, on the pH of the oxidant and on the mixing ratio. The ready-to-use colorant has a basic pH higher than 7 and preferably one of 8 to 11. The adjustment to basic conditions is preferably done with ammonia, although organic amines, for example 2-amino-2-methyl-1-propanol, tris(hydroxymethyl) aminomethane, monoethanolamine and triethanolamime, or mixtures of organic amines and ammonia, as well as inorganic bases such as sodium hydroxide, potassium hydroxide, sodium carbonate, sodium hydrogen carbonate, potassium carbonate, potassium hydrogen carbonate, sodium phosphate, borax ($Na_2B_4O_7 \times 10H_2O$) or disodium hydrogen phosphate can be used. Up to the high pH values, the pH can be corrected with an inorganic or organic acid, for example with phosphoric acid, acetic acid, lactic acid, ascorbic acid, citric acid or tartaric acid.

An amount of colorant sufficient for hair dyeing is applied to the keratin fibers, generally about 30 to 120 grams, and the colorant is then allowed to act on the fibers at about 15 to 50° C., preferably at 30 to 40° C. for about 1 to 60 minutes, preferably 5 to 30 minutes, after which the keratin fibers are rinsed with water and dried. Following this rinsing, the fibers can optionally be washed with a shampoo and possibly post-rinsed with a weak organic acid, for example citric acid or tartaric acid. The keratin fibers are then dried.

It is also possible, when it is necessary to dye hair that has been damaged to different degrees (for example, to re-dye previously oxidatively dyed parts of hair), to apply to the previously damaged parts of the hair (for example the hair tips) the dye carrier composition in its neat form or diluted only with another acidic, neutral or basic aqueous component, while the mixture of the dye carrier composition and the oxidant is applied to the previously only slightly damaged or undamaged parts of the hair (for example the hair roots and hair shafts). The component used for dilution can contain the afore-said common additives for solutions, creams, emulsions or gels. By this method, it is possible to achieve colorations adapted to the hair consistency and characterized by a hair-sparing balance between hair roots and hair tips, which is not possible when common oxidative hair colorants are used, because an oxidant is always needed for the coupling of the dye precursors.

The colorant of the invention produces colorations that stand out by their special color intensity and brightness, by a good color balance between damaged and undamaged hair (for example between hair tips and newly grown hair) and by a very good light stability and perspiration resistance.

Some of the dyes of formula (I) are by themselves known. They can be prepared by methods analogous to the known methods of preparation, for example via azo coupling of 2-aminothiazole derivatives with indole derivatives followed by quaternization.

The following examples will explain the subject matter of the invention in greater detail without limiting it to the examples.

EXAMPLES

Examples 1 to 9

| | |
|---|---|
| 0.66 g | of dye of formula (I) |
| 12.5 g | of ethanol |
| 10.0 g | of cetyltrimethylammonium chloride |
| to 100.0 g | water |

A) According to the Invention 5 g of the foregoing dye solution was mixed with 5 g of a 9% hydrogen peroxide solution. The dye solution was adjusted to the desired pH by addition of ammonia. The resulting ready-to-use hair colorant was applied to dark-blond hair and uniformly distributed with a brush. After a treatment time of 30 min at 40° C., the hair was rinsed with lukewarm water, washed with a shampoo, rinsed with lukewarm water and then dried.

B) Not According to the Invention (without Hydrogen Peroxide)

5 g of the foregoing dye solution was mixed with 5 g of water. The dye solution was adjusted to the desired pH by addition of ammonia. The resulting ready-to-use hair colorant was applied to dark-blond hair and uniformly distributed with a brush. After a treatment time of 30 min at 40° C., the hair was rinsed with lukewarm water, washed with a shampoo, rinsed with lukewarm water and then dried.

The coloring results are summarized in the following Table 1

TABLE 1

| Example | Compound of Formula (I) | pH of Mixture | Color Shade After Dyeing: A: with $H_2O_2$ B: without $H_2O_2$ |
|---|---|---|---|
| 1 | 3-methyl-2-[(1-methyl-2-phenyl-1H-indol-3-yl)azo]thiazolium monomethylsulfate | 9.6 | A) bright ruby-red B) dark mahogany |
| 2 | 3,5-dimethyl-2-[(1-methyl-2-phenyl-1H-indol-3-yl)azo]thiazolium monomethylsulfate | 8.9 | A) bright Bordeaux red B) dark Bordeaux red |
| 3 | 3,4-dimethyl-2-[(1-methyl-2-phenyl-1H-indol-3-yl)azo]thiazolium monomethylsulfate | 9.0 | A) bright Bordeaux red B) dark Bordeaux red |
| 4 | 3,4,5-trimethyl-2-[(1-methyl-2-phenyl-1H-indol-3-yl)azo]thiazolium monomethylsulfate | 9.1 | A) bright Bordeaux red B) dark Bordeaux red |
| 5 | 5-methoxy-3-methyl-2-[(1-methyl-2-phenyl-1H-indol-3-yl)azo]thiazolium monomethylsulfate | 9.3 | A) bright Bordeaux red B) dark eggplant |
| 6 | 3-methyl-2-[(1,2-dimethyl-1H-indol-3-yl)azo]-thiazolium monomethylsulfate | 9.5 | A) bright copper orange B) dark copper |

TABLE 1-continued

| Example | Compound of Formula (I) | pH of Mixture | Color Shade After Dyeing: A: with $H_2O_2$ B: without $H_2O_2$ |
|---|---|---|---|
| 7 | 3,5-dimethyl-2-[(1,2-dimethyl-1H-indol-3-yl)azo]thiazolium monomethylsulfate | 8.9 | A) bright mahogany B) dark mahogany |
| 8 | 3,4-dimethyl-2-[(1,2-dimethyl-1H-indol-3-yl)azo]thiazolium monomethylsulfate | 9.5 | A) bright mahogany B) dark mahogany |
| 9 | 3,4,5-trimethyl-2-[(1,2-dimethyl-1H-indol-3-yl)azo]thiazolium monomethylsulfate | 9.1 | A) bright mahogany B) dark mahogany |

Examples 10 to 18

| | |
|---|---|
| 0.66 g | of dye of formula (I) |
| 5.0 g | of ethanol |
| 4.0 g | of decylglucoside |
| 0.2 g | of ethylenediaminetetraacetic acid disodium salt |
| to 100 g | water, demineralized |

A) According to the Invention 5 g of the foregoing dye solution was mixed with 5 g of a 9% hydrogen peroxide solution. The dye solution was adjusted to the desired pH by addition of ammonia. The resulting ready-to-use hair colorant was applied to dry, natural dark-blond hair and uniformly distributed with a brush. After a treatment time of 30 min at 40° C., the hair was rinsed with lukewarm water, washed with a shampoo, rinsed with lukewarm water and then dried.

B) Not According to the Invention (without Hydrogen Peroxide)

5 g of the foregoing dye solution was mixed with 5 g of water. The dye solution was adjusted to the desired pH by addition of ammonia. The resulting ready-to-use hair colorant was applied to dry, natural dark-blond hair and uniformly distributed with a brush. After a treatment time of 30 min at 40° C., the hair was rinsed with lukewarm water, washed with a shampoo, rinsed with lukewarm water and then dried.

The coloring results are summarized in the following Table 2.

Unless otherwise indicated, all percentages given in the present patent application are by weight.

The invention claimed is:

1. Agent for the simultaneous brightening and dyeing of keratin fibers, characterized in that it contains a) at least one oxidant and b) at least one indolylthiazoliumazo dye of formula (I) and that c) it has a basic pH

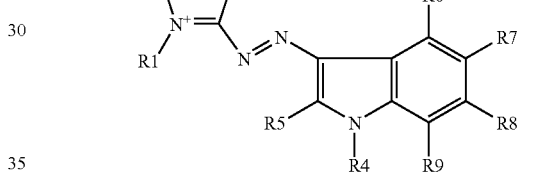

wherein

R1 stands for a saturated or unsaturated $(C_1-C_{12})$-alkyl group, a halogen atom-substituted $(C_1-C_{12})$-alkyl group, a hydroxy-$(C_1-C_{12})$-alkyl group, a $(C_1-C_6)$-alkoxy-$(C_1-C_{12})$-alkyl group, an amino-$(C_1-C_{12})$-alkyl group, a $(C_1-C_6)$-alkylamino-$(C_1-C_{12})$-alkyl group, a di$(C_1-C_6)$-alkyl-amino-$(C_1-C_{12})$-alkyl group, a cyano-

TABLE 2

| Example | Compound of Formula (I) | pH of Mixture | Color Shade After Dyeing: A: with $H_2O_2$ B: without $H_2O_2$ |
|---|---|---|---|
| 10 | 3-methyl-2-[(1-methyl-2-phenyl-1H-indol-3-yl)azo]thiazolium monomethylsulfate | 9.6 | A) bright ruby-red B) dark mahogany |
| 11 | 3,5-dimethyl-2-[(1-methyl-2-phenyl-1H-indol-3-yl)azo]thiazolium monomethylsulfate | 8.9 | A) bright Bordeaux red B) dark Bordeaux red |
| 12 | 3,4-dimethyl-2-[(1-methyl-2-phenyl-1H-indol-3-yl)azo]thiazolium monomethylsulfate | 9.0 | A) bright Bordeaux red B) dark Bordeaux red |
| 13 | 3,4,5-trimethyl-2-[(1-methyl-2-phenyl-1H-indol-3-yl)azo]thiazolium monomethylsulfate | 9.1 | A) bright Bordeaux red B) dark Bordeaux red |
| 14 | 5-methoxy-3-methyl-2-[(1-methyl-2-phenyl-1H-indol-3-yl)azo]thiazolium monomethylsulfate | 9.3 | A) bright Bordeaux red B) dark eggplant |
| 15 | 3-methyl-2-[(1,2-dimethyl-1H-indol-3-yl)azo]-thiazolium monomethylsulfate | 9.5 | A) bright copper-orange B) dark copper |
| 16 | 3,5-dimethyl-2-[(1,2-dimethyl-1H-indol-3-yl)azo]thiazolium monomethylsulfate | 8.9 | A) bright mahogany B) dark mahogany |
| 17 | 3,4-dimethyl-2-[(1,2-dimethyl-1H-indol-3-yl)azo]thiazolium monomethylsulfate | 9.5 | A) bright mahogany B) dark mahogany |
| 18 | 3,4,5-trimethyl-2-[(1,2-dimethyl-1H-indol-3-yl)azo]thiazolium monomethylsulfate | 9.1 | A) bright mahogany B) dark mahogany |

($C_1$-$C_{12}$)-alkyl group, a substituted or unsubstituted phenyl group or a substituted or unsubstituted benzyl group;

R2 and R3 can be equal or different and independently of each other stand for hydrogen, a halogen atom, a saturated or unsaturated ($C_1$-$C_{12}$)-alkyl group, a ($C_1$-$C_{12}$)-alkoxy group, a nitro group, an amino group, a ($C_1$-$C_{12}$)-alkylamino group, a di($C_1$-$C_{12}$)-alkylamino group, a ($C_1$-$C_{12}$)-hydroxyalkylamino group, a di($C_1$-$C_{12}$)-hydroxyalkylamino group, a sub-stituted or unsubstituted phenyl group or a substituted or unsubstituted heteroaryl group;

R4 stands for a saturated or unsaturated ($C_1$-$C_{12}$)-alkyl group, a halogen atom-substituted ($C_1$-$C_{12}$)-alkyl group, a hydroxy-($C_1$-$C_{12}$)-group, a ($C_1$-$C_6$)-alkoxy-($C_1$-$C_{12}$)-alkyl group, an amino-($C_1$-$C_{12}$)-alkyl group, a ($C_1$-$C_6$)-alkylamino-($C_1$-$C_{12}$)-alkyl group, a di($C_1$-$C_6$)-alkyl-amino-($C_1$-$C_{12}$)-alkyl group, a cyano-($C_1$-$C_{12}$)-alkyl group, a substituted or unsubstituted phenyl group, a substituted or unsubstituted benzyl group or a substituted or unsub-stituted heteroaryl group;

R5 stands for hydrogen, a saturated ($C_1$-$C_{12}$)-alkyl group, a substituted or unsubstituted phenyl group or a C(O)O-($C_1$-$C_{12}$)-alkyl group;

R6, R7, R8 and R9 can be equal or different and independently of each other stand for hydrogen, a halogen atom, a saturated or unsaturated ($C_1$-$C_{12}$)-alkyl group, a hydroxyl group, a ($C_1$-$C_{12}$)-alkoxy group, a nitro group, an amino group, a ($C_1$-$C_{12}$)-alkylamino group or a di($C_1$-$C_{12}$)-alkylamino group; and $A^-$ stands for an anion of an organic or inorganic acid.

2. Agent as defined in claim 1, characterized in that R1 stands for a saturated or un-saturated ($C_1$-$C_{12}$)-alkyl group and R4 stands for a saturated or unsaturated ($C_1$-$C_{12}$)-alkyl group or a substituted or unsubstituted phenyl group.

3. Agent as defined in claim 2, characterized in that R1 stands for a saturated ($C_1$-$C_{12}$)-alkyl group and R4 stands for a saturated ($C_1$-$C_{12}$)-alkyl group or a phenyl group.

4. Agent as defined in claim 1, characterized in that $A^-$ stands for a chloride, bromide, iodide, hydrogen sulfate, sulfate, toluenesulfonate, benzenesulfonate, mo-nomethylsulfate, hexafluorophosphate, hexafluoroantimonate, tetrafluoroborate, tetraphe-nylborate, formate, acetate or propionate anion.

5. Agent as defined in claim 1, characterized in that the compound of formula (I) is selected from among 3-methyl-2-[(1-methyl-2-phenyl-1H-indol-3-yl)azo]thiazolium chloride, 3-methyl-2-[(1-methyl-2-phenyl-1H-indol-3-yl)azo]thiazolium bromide, 3-methyl-2-[(1-methyl-2-phenyl-1H-indol-3-yl)azo]thiazolium monomethylsulfate, 3,4-dimethyl-2-[(1-methyl-2-phenyl-1H-indol-3-yl)azo]thiazolium chloride, 3,4-dimethyl-2-[(1-methyl-2-phenyl-1H-indol-3-yl)azo]thiazolium bromide, 3,4-dimethyl-2-[(1-methyl-2-phenyl-1H-in-dol-3-yl)azo]thiazolium monomethylsulfate, 3,5-dimethyl-2-[(1-methyl-2-phenyl-1H-indol-3-yl)azo]thiazolium chloride, 3,5-dimethyl-2-[(1-methyl-2-phenyl-1H-indol-3-yl)azo]thiazo-lium bromide, 3,5-dimethyl-2-[(1-methyl-2-phenyl-1H-indol-3-yl)azo]thiazolium monome-thylsulfate, 3,4,5-trimethyl-2-[(1-methyl-2-phenyl-1H-indol3-yl)azo]thiazolium chloride, 3,4,5-trimethyl-2-[(1-methyl-2-phenyl-1H-indol-3-yl)azo]thiazolium bromide, 3,4,5-trimethyl-2-[(1-methyl-2-phenyl-1H-indol-3-yl)azo]thiazolium monomethylsulfate, 5-bromo-3-methyl-2-[(1-methyl-2-phenyl-1H-indol-3-yl)azo]thiazolium chloride, 5-bromo-3-methyl-2-[(1-methyl-2-phenyl-1H-indol-3-yl)azo]thiazolium bromide, 5-bromo-3-methyl-2-[(1-methyl-2-phenyl-1H-indol-3-yl)azo]thiazolium monomethylsulfate, 5-methoxy-3-methyl-2-[(1-methyl-2-phenyl-1H-indol-3-yl)azo]thiazolium chloride, 5-methoxy-3-methyl-2-[(1-methyl-2-phenyl-1H-indol-3-yl)azo]thiazolium bromide, 5-methoxy-3-methyl-2-[(1-methyl-2-phenyl-1H-indol-3-yl)azo]thiazolium monomethylsulfate, 3-methyl-2-[(1,2-dimethyl-1H-indol-3-yl)-azo]thiazolium chloride, 3-methyl-2-[(1,2-dimethyl-1H-indol-3-yl)azo]thiazolium bromide, 3-methyl-2-[(1,2-dimethyl-1H-indol-3-yl)azo]thiazolium monomethylsulfate, 3,4-dimethyl-2-[(1,2-dimethyl-1H-indol-3-yl)azo]thiazolium chloride, 3,4-dimethyl-2-[(1,2-dimethyl-1H-in-dol-3-yl)azo]thiazolium bromide, 3,4-dimethyl-2-[(1,2-dimethyl-1H-indol-3-yl)azo]thiazoli-lium monomethylsulfate, 3,5-dimethyl-2-[(1,2-dimethyl-1H-indol-3-yl)azo]thiazolium chlo-ride, 3,5-dimethyl-2-[(1,2-dimethyl-1H-indol-3-yl)azo]thiazoliumbromide, 3,5-dimethyl-2-[(1,2-dimethyl-1H-indol-3-yl)azo]thiazolium monomethylsulfate, 3,4,5-trimethyl-2-[(1,2-di-methyl-1H-indol-3-yl)azo]thiazolium chloride, 3,4,5-trimethyl-2-[(1,2-dimethyl-1H-indol-3-yl)azo]thiazolium bromide, 3,4,5-trimethyl-2-[(1,2-dimethyl-1H-indol-3-yl)azo]thiazolium monomethylsulfate, 5-bromo-3-methyl-2-[(1,2-dimethyl-1H-indol-3-yl)azo]thiazolium chlo-ride, 5-bromo-3-methyl-2-[(1,2-dimethyl-1H-indol-3-yl)azo]thiazolium bromide, 5-bromo-3-methyl-2-[(1,2-dimethyl-1H-indol-3-yl)azo]thiazolium monomethylsulfate, 5-methoxy-3-me-thyl-2-[(1,2-dimethyl-1H-indol-3-yl)azo]thiazolium chloride, 5-methoxy-3-methyl-2-[(1,2-di-methyl-1H-indol-3-yl)azo]thiazolium bromide, 5-methoxy-3-methyl-2-[(1,2-dimethyl-1H-in-dol-3-yl)azo]thiazolium monomethylsulfate, 3-methyl-2-[(1,2-dimethyl-1H-indol-3-yl)azo]-5-nitrothiazolium chloride, 3-methyl-2-[(1,2-dimethyl-1H-indol-3-yl)azo]-5-nitrothiazolium bro-mide, 3-methyl-2-[(1,2-dimethyl-1H-indol-3-yl)azo]-5-nitrothiazolium monomethylsulfate, 3-methyl-2-[(1,2-diphenyl-1H-indol-3-yl)azo]thiazolium chloride, 3-methyl-2-[(1,2-diphenyl-1H-indol-3-yl)azo]thiazolium bromide, 3-methyl-2-[(1,2-diphe-nyl-1H-indol-3-yl)-azo]thiazo-lium monomethylsulfate, 3,4-dimethyl-2-[(1,2-diphenyl-1H-indol-3-yl)azo]thiazolium chlo-ride, 3,4-dimethyl-2-[(1,2-diphenyl-1H-indol-3-yl)azo]thiazolium bromide, 3,4-dimethyl-2-[(1,2-diphenyl-1H-in-dol-3-yl)azo]thiazolium monomethylsulfate, 3,5-dimethyl-2-[(1,2-diphe-nyl-1H-indol-3-yl)azo]thiazolium chloride, 3,5-dimethyl-2-[(1,2-diphenyl-1H-indol-3-yl)azo]-thiazo-lium bromide, 3,5-dimethyl-2-[(1,2-diphenyl-1H-indol-3-yl)azo]thiazolium monome-thylsulfate, 3,4,5-trimethyl-2-[(1,2-diphenyl-1H-indol-3-yl)azo]thiazolium chloride, 3,4,5-trimethyl-2-[(1,2-diphenyl-1H-indol-3-yl)azo]thiazolium bromide, 3,4,5-trimethyl-2-[(1,2-di-phenyl-1H-indol-3-yl)azo]thiazolium monomethylsulfate, 5-bromo-3-methyl-2-[(1,2-diphenyl-1H-indol-3-yl)azo]thiazolium chloride, 5-bromo-3-methyl-2-[(1,2-diphenyl-1H-indol-3-yl)azo]thiazolium bromide, 5-bromo-3-methyl-2-[(1,2-diphenyl-1H-indol-3-yl)-azo]thiazoli-um monomethylsulfate, 5-methoxy-3-methyl-2-[(1,2-diphenyl-1H-indol-3-yl)azo]thiazolium chloride, 5-methoxy-3-methyl-2-[(1,2-diphenyl-1H-indol-3-yl)azo]thiazolium bromide and 5-methoxy-3-methyl-2-[(1,2-diphenyl-1H-indol-3-yl)azo]thiazolium monomethylsulfate.

6. Agent as defined in claim 1, characterized in that it contains the compound of formula (I) in an amount from 0.01 to 10 weight percent.

7. Agent as defined in claim 1, characterized in that it additionally contains at least one other oxidation-resistant direct dye and/or oxidative dye precursor.

8. Agent as defined in claim 1, characterized in that the ready-to-use colorant has a pH of 8 to 11.

9. Agent as defined in claim 1, characterized in that the oxidant is selected from among hydrogen peroxide and the compounds of addition thereof to urea, melamine, sodium borate or sodium carbonate.

10. Agent as defined in claim 1, characterized in that it is in the form of a 2-component agent consisting of a dye carrier composition (A) containing at least one indolylthiazoliumazo dye of formula (I) and a component (B) containing an oxidant.

11. Agent as defined in claim 1, characterized in that it is a hair colorant.

* * * * *